Dec. 13, 1966 V. G. BELL, JR., ET AL 3,291,505

MOUNTING BOARD FOR ACCOUNTING FORMS

Filed April 7, 1965 3 Sheets-Sheet 1

INVENTORS:
VINCENT G. BELL, JR
CALVIN DURRELL CASSEL
JOHN A. GWILLIAM

BY Howson & Howson

ATTYS

Dec. 13, 1966 V. G. BELL, JR., ET AL 3,291,505

MOUNTING BOARD FOR ACCOUNTING FORMS

Filed April 7, 1965 3 Sheets-Sheet 2

INVENTORS:
VINCENT G. BELL, JR.
CALVIN DURRELL CASSEL
JOHN A. GWILLIAM

BY Howson & Howson

ATTYS

MOUNTING BOARD FOR ACCOUNTING FORMS

Filed April 7, 1965 3 Sheets-Sheet 3

INVENTORS:
VINCENT G. BELL, JR
CALVIN DURRELL CASSEL
JOHN A. GWILLIAM
BY Howson & Howson
ATTYS United States Patent Office 3,291,505
Patented Dec. 13, 1966

3,291,505

MOUNTING BOARD FOR ACCOUNTING FORMS

Vincent G. Bell, Jr., Strafford, Wayne, Calvin Durrell Cassel, Gardenville, and John A. Gwilliam, Perkasie, Pa., assignors to Safeguard Corporation, Lansdale, Pa., a corporation of Pennsylvania Filed Apr. 7, 1965, Ser. No. 446,227
6 Claims. (Cl. 282—29)

The present invention relates generally to mounting boards for accounting forms and relates more particularly to a mounting board construction characterized by a novel spring-loaded form holding assembly which is adapted for receiving and retaining various quantities of accounting forms.

Devices of the present type have achieved widespread use in connection with accounting systems such as payroll and disbursement records wherein shingled checks or voucher stubs overlie a journal sheet to provide an automatic recording on the journal of entries made on the shingled stubs. The shingled sheets, as well as the journal sheets, are typically secured and aligned in a mounting board by means of a plurality of spaced holes along the left hand margins thereof which are engaged by correspondingly spaced studs of the mounting board. Some form of clamping means is generally provided to secure the forms on the studs.

Shortcomings of prior mounting board arrangements have included difficulties in inserting and removing the forms due to the complexities of securing and releasing the form clamping mechanism which might be secured for example by pivotal latch members engaging ones of the studs. Not only have such arrangements been inconvenient to operate, but, in addition, such boards are usually best suited for a specific number of forms and do not operate as effectively with a greater or lesser number. Prior devices furthermore have been characterized by constructions which are expensive to manufacture and assemble and which must accordingly be marketed at a relatively high price.

It is a primary object of the present invention to provide a mounting board for accounting forms which is spring-loaded to adapt to the receiving and retaining of various quantities of forms.

Another object of the invention is to provide a mounting board as described wherein the clamping element is spring-loaded independently of the clamp assembly latching arrangement such that latching of the assembly may be easily accomplished regardless of the number of forms in the mounting board.

A further object of the invention is to provide a mounting board as described which may be conveniently operated, the form retaining assembly being secured and released by means of a push button arrangement for ease of operation.

An additional object of the invention is to provide a mounting board as described which is made primarily from inexpensiev extruded elements for economical manufacture and assembly.

Additional objects and adavntages of the invention will be more readily apparent from a consideration of the following detailed description of embodiments of the invention when taken together with the accompanying drawings in which.

Figures 1, 2, 3, 4:
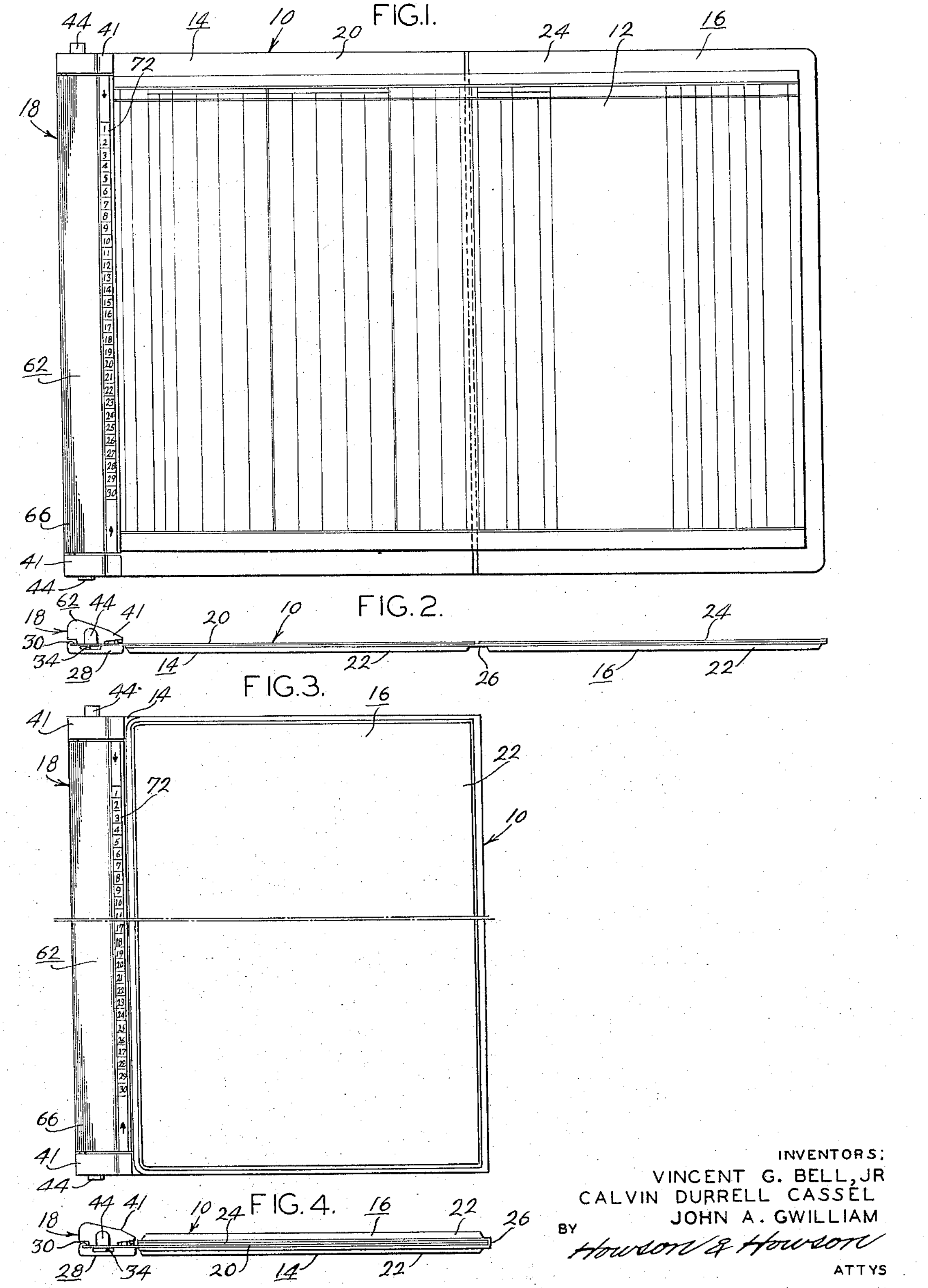
FIG. 1 is a plan view of a mounting board in accordance with the present invention shown in the open position with a ledger sheet clamped in place thereon.
FIG. 2 is a front elevational view of the mounting board as shown in FIG. 1.
FIG. 3 is a plan view showing the board of FIG. 1 in the closed or folded position.
FIG. 4 is a front elevational view of the board as shown in FIG. 3.

Referring to the drawings, FIGS. 1 and 2 show a mounting board 10 in accordance with the present invention as it appears in the open position with a ledger sheet 12 clamped therein. The mounting board in brief includes a main board element 14 and a hinged board element 16 connected along the right hand edge thereof. A clamping assembly 18 extends along the left edge of the main board element for securing and aligning the forms. As shown in FIGS. 3 and 4, in the closed or folded position the hinged board element 16 covers the working surface of the main board element 14 to protect the mounted forms from damage or accidental marking during carrying or storage of the mounting board.

The principal novel of the invention resides in the construction of the clamping assembly 18 which is shown in more specific detail in FIGS. 5–13. The main board element 14 includes a thin metal plate 20 having a vinyl backing 22 secured thereto. The hinged board element 16 likewise includes a metal plate 24 and the vinyl backing 22 extends beneath the plate 24, being of reduced thickness in the region 26 between the plates to form a flexible hinge. The exposed faces of the plates 20 and 24 provide smooth writing surfaces upon which the forms are mounted.

As clearly shown in FIGS. 9–13, the vinyl backing 22 terminates adjacent the inner edge of the clamping assembly 18 and a metal base plate 28 is secured to the plate 20 beneath the clamping assembly, the base plate being secured by a lip portion 30 engaging the left hand edge of the plate 20 and by a plurality of aligned spaced studs 32 which extend through the base plate in a riveted attachment. As shown particularly in FIG. 13, the base plate 28 includes a shallow groove 34 along its upper face adapted to receive the latch bar 36 in sliding relation beneath the plate 20. Slots 38 in the plate 20 permit the passage through the plate of the latch fingers 40 extending vertically from the latch bar 36. End caps 41 are screwed to the upper surface of the plate 20 over the ends of the base plate 28. Each end cap, which may be made of molded plastic or similar material, includes a push button recess 42 adapted to receive a latch push button 44. Extending downwardly from each push button is a boss 46 which seats within a slot 48 in the end of the latch bar 36. The latch bar may thus be actuated by means of the opposed push buttons to move the latch fingers 40 in the slots 38, which movement effects the latching and unlatching of the clamping assembly as will be apparent from the description below.

Figure 5:
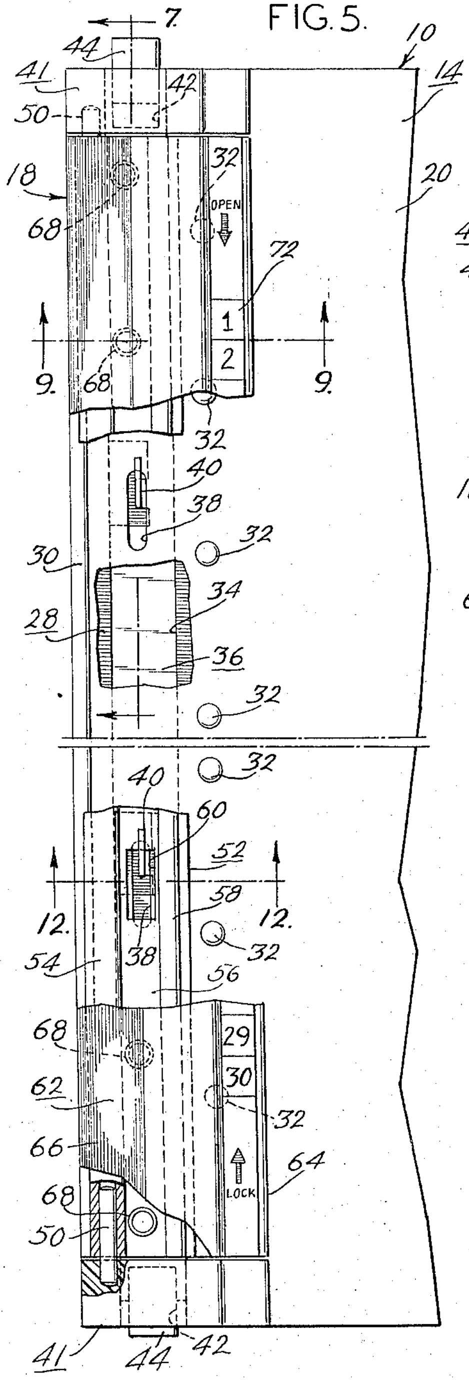
FIG. 5 is an enlarged plan view of the left hand edge of the mounting board with the clamping assembly thereof being partly cut away to show details of construction.
Figure 7:
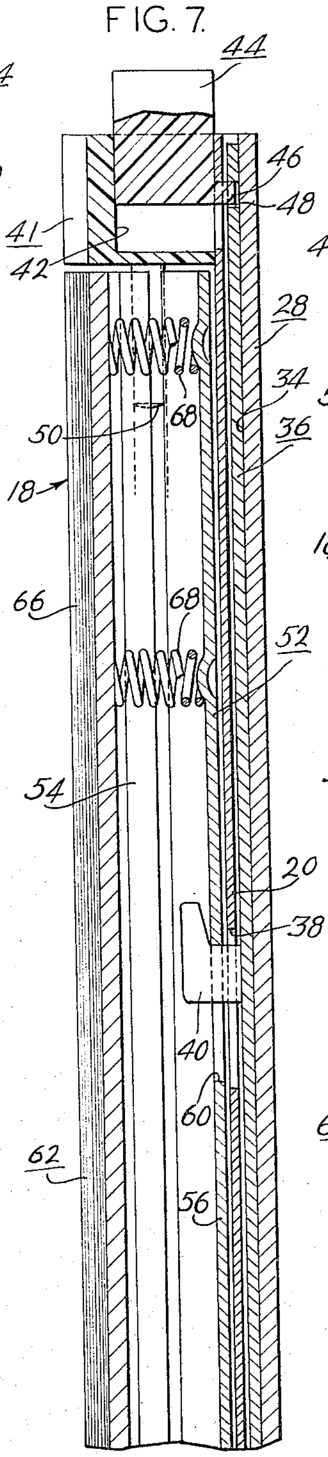
FIG. 7 is an enlarged sectional view taken along line 7—7 of FIG. 5 showing the clamping assembly in the latched position.
Figure 8:
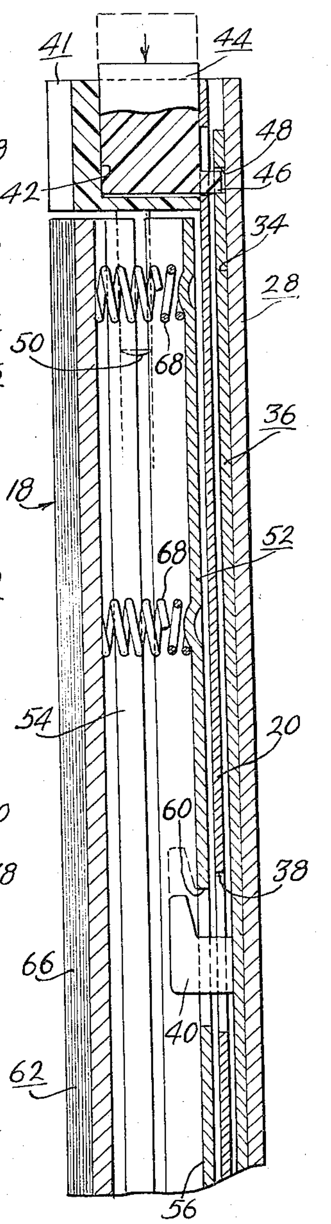
FIG. 8 is a view as in FIG. 7 showing the clamping assembly in the unlatched position.
Figure 6:
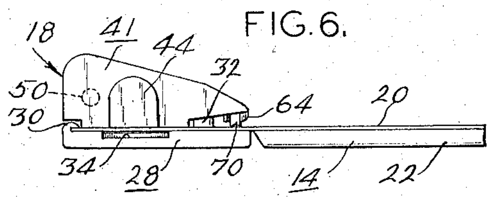
FIG. 6 is a front elevational view of the portion of the board shown in FIG. 5.

Pivoted between end caps 41 by the pivot pins 50 is a hinge base 52 of an extruded shape which includes an annularly shaped portion 54 engaging the pivot pins 50. Extending from the portion 54 is a flat base portion 56 from which rises a perpendicular pivot arm 58. When the hinge base is pivoted into contact with the plate 20, the base portion 56 of the hinge base lies parallel with the plate 20. Slots 60 in the base portion as shown in FIGS. 5, 7 and 8 are adapted to receive the latch fingers 40 of the latch bar 36. Upon actuation of the lower push button to move the latch fingers toward the upper end of the board, the latch fingers engage the base portion of the hinge base and secure the hinge base to the plate 20 as shown in FIG. 7. Release of the hinge base is accomplished as indicated in FIG. 8 by actuating the upper push button to move the latch fingers downwardly.

A clamp element 62 is pivotally mounted on the pivot arm 58 of the hinge base. The clamp element is characterized by a form securing portion 64 extending over the studs 32 and a grooved actuating portion 66 which extends over the annular portion 54 of the hinge base. Compression springs 68 are provided between the actuation portion 66 of the clamp element and the base portion 60 of the hinge base to spring load the form securing portion 64 of the clamp element into contact with forms on the plate 20, an extruded vinyl form detaining strip 70 having a fish-tailed detaining edge being mounted on the portion 66 of the clamp element to provide a suitable gripping of the forms.

Figure 9:
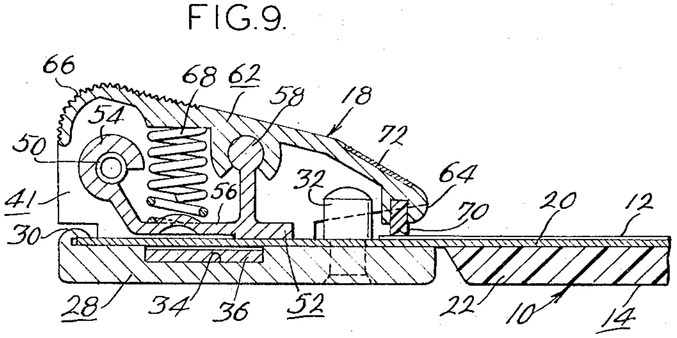
FIG. 9 is a sectional view taken along line 9—9 of FIG. 5 showing the clamping assembly in the latched position securing a ledger sheet to the board.
Figure 12:
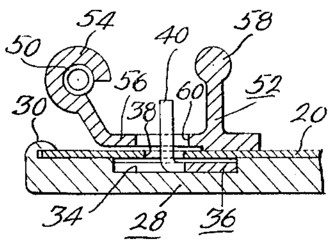
FIG. 12 is a sectional view taken along line 12—12 of FIG. 5 showing the manner in which the hinge base is secured by the latch assembly.
Figure 10:
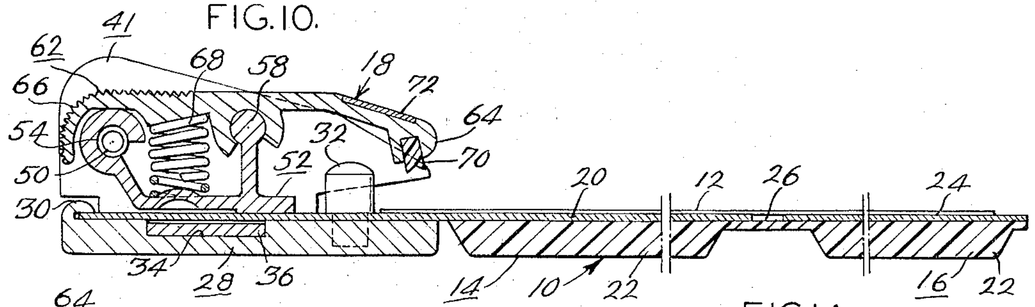
FIG. 10 is a sectional view similar to that of FIG. 9 showing the manner in which the clamp element may be raised against the spring pressure without releasing the latch assembly for receiving additional forms and, in addition, showing the hinged connection of the board elements.

With the hinge base in the latched position, such as shown in FIGS. 5, 7 and 9, the clamp element is spring-loaded to secure forms in position on the plate 20. The clamp element is adapted to receive additional forms without unlatching the hinge base and may be raised for this purpose as shown in FIG. 10 by depressing the actuating portion 66 against the force of the springs 68. The spring-loading of the clamp element for pivotal movement independently of the hinge base latching assembly permits the unit to accommodate various quantities of forms, a large number of forms being shown on the mounting board in the broken line illustration of FIG. 11.

Figures 11, 13, 14, 15, 16:
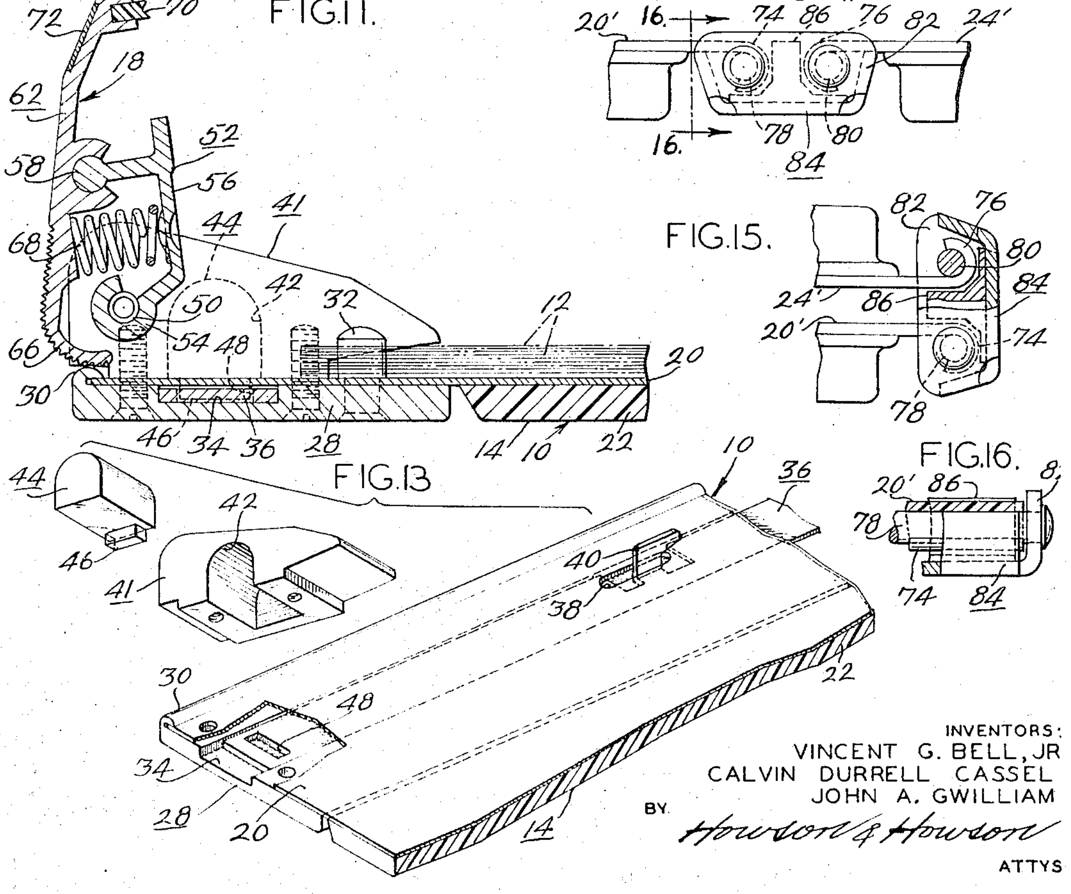
FIG. 11 is a view similar to FIG. 10 showing the clamping assembly in the open position.
FIG. 13 is an exploded view showing the components of the latch assembly and indicating their cooperating relationship.
FIG. 14 is a partial front elevational view of a modified board showing a modified hinge arrangement for joining the board elements.
FIG. 15 is a view as in FIG. 14 showing the hinge arrangement in the folded position.
FIG. 16 is a view partly in section taken along line 16—16 of FIG. 14.

For insertion of forms in the board, the upper push button is depressed to unlatch the hinge base as shown in FIG. 8 and the hinge base and clamp element are pivoted upwardly to the position shown in FIG. 11 to allow convenient insertion of the forms over the studs 32. The hinge base and clamp element are then pivoted to the position shown in FIG. 10 with the hinge base being urged against the pressure of the springs 68 into contact with the plate 20 to permit latching of the hinge base by the actuation of the lower push button. The force of the springs 68 tends to lift the hinge base from the plate 20 and thus exerts a sufficient upward force on the latch fingers 40 to prevent the possible disengagement of the latch fingers during usage or transportation of the mounting board.

A numbered insert 72 or other indexing indicia may be applied to the edge of the clamp element adjacent the forms for convenience in making entries, the indicia being correlated with the positioning of the stud holes in the forms to assure accurate alignment.

An alternate arrangement for hinging the hinged board element 16 to the main board element 14 is shown in FIGS. 14–16 wherein an arrangement is substituted for the vinyl backing hinge to assure a sufficient spacing between the board elements in the folded position to prevent binding with large numbers of forms. In this construction, the board element plates 20′ and 24′ terminate in annularly formed hinge edges 74 and 76, which edges engage hinge rods 78 and 80 extending the length of the joint. The hinge rods are supported by the ends 82 of the trough-shaped hinge element 84 which extends beneath the rods 78 and 80. A central divider 86 of the hinge element lies flush with the surfaces of the plates 20′ and 24′ in the open position of the mounting board and acts as a spacer between the board surfaces in the folded position of the board as shown in FIG. 15.

The mounting board may be economically manufactured and assembled due to the use of extrudable and moldable elements and the simple assembly steps required. The convenient push button operation permits a fast and convenient board operation for inserting or removing forms and the adaptability of the board to various quantities of forms permits usage with a variety of accounting systems.

Manifestly, changes in details of construction can be effected by those skilled in the art without departing from the spirit and the scope of the invention as defined in and limited solely by the appended claims.

We claim:

1. A mounting board for accounting forms comprising a plate, a form clamping assembly mounted along an edge of said plate, said assembly comprising an aligned row of spaced studs spaced from and parallel to said plate edge, a hinge base pivotally mounted on said plate between said studs and plate edge for pivotal movement about an axis parallel to said row of studs, latch means for selectively securing said hinge base in a locked position against said plate, said latch means including a latch bar slideably disposed beneath said plate, latch fingers of said latch bar extending through slots in said plate and disposed between the edge of said plate and said row of studs, slots in said hinge base adapted for engagement by said latch fingers, and means for slideably actuating said latch bar to secure or release said hinge base, a clamp element pivotally mounted on said hinge base, a form securing portion of said clamp element extending over said studs when said hinge base is secured relative to said plate, and spring means associated with said hinge base for urging said form securing portion toward said plate for securing forms thereon, said form securing portion adapted to be pivoted away from said plate against the bias of the spring means to expose said studs and permit insertion of forms, the pivoting of said hinge base away from said plate permitting insertion and removal of perforated forms from said studs.

2. A mounting board for accounting forms comprising a plate, a form clamping assembly mounted along an edge of said plate, said assembly comprising an aligned row of spaced studs spaced from and parallel to said plate edge, end caps secured to said plate at the ends of said edge, a hinge base pivotally mounted on said end caps between said studs and plate edge for pivotal movement about an axis parallel to said row of studs, the pivot axis of said hinge base extending along one edge thereof, latch means for selectively securing said hinge base in a locked position against said plate when said hinge base is pivoted toward said studs, said latch means including a latch bar slideably disposed beneath said plate, latch fingers of said latch bar extending through slots in said plate, slots in said hinge base adapted for engagement by said latch fingers, and means for slideably actuating said latch bar to secure or release said hinge base, a pivot arm extending upwardly from said hinge base when said hinge base is in the secured position, a clamp element pivotally mounted on said hinge base pivot arm, a form securing portion of said clamp element extending over said studs when said hinge base is secured against said plate, an actuating portion of said clamp element extending toward said plate edge, and spring means associated with said hinge base for urging said form securing portion toward said plate for securing forms thereon, said form securing portion adapted to be pivoted away from said plate against the bias of the spring means to expose said studs and permit insertion of forms, the pivoting of said hinge base away from said plate permitting insertion and removal of perforated forms from said studs.

3. A mounting board as claimed in claim 2 wherein said means for slideably actuating said latch bar comprises push buttons slideably mounted in said end caps, and means connecting said push buttons with said latch bar whereby selective actuation of said push buttons produces sliding movement of said latch bar.

4. A mounting board as claimed in claim 3 including a resilient form detaining strip having a fish-tailed detaining edge mounted on said form securing portion of said clamp element.

5. A mounting board as claimed in claim 4 including a hinged plate pivotally connected to said plate along an edge thereof parallel to and opposed from the edge carrying said form clamping assembly.

6. A mounting board as claimed in claim 5 including hinge means joining said plate and hinged plate for permitting a folding of said hinged plate into a superposed parallel relation with said plate, said hinge means providing a spacing of said plates in the folded position to permit a parallel folding of the plates with a substantial quantity of forms mounted in the board.

References Cited by the Examiner

UNITED STATES PATENTS

| | | | |
|---|---|---|---|
| 2,095,562 | 10/1937 | Carson | 282—29.2 |
| 2,635,608 | 4/1953 | Shepherd | 282—29.2 X |
| 3,014,258 | 12/1961 | Pearl | 129—35 X |

FOREIGN PATENTS

| | | |
|---|---|---|
| 111,409 | 11/1928 | Austria. |
| 570,216 | 1/1924 | France. |
| 1,085,183 | 7/1954 | France. |
| 502,468 | 3/1939 | Great Britain. |
| 546,951 | 8/1942 | Great Britain. |
| 325,109 | 12/1957 | Switzerland. |

JEROME SCHNALL, *Primary Examiner.*